United States Patent [19]

Lingane et al.

[11] 4,043,599

[45] Aug. 23, 1977

[54] ACID PREINJECTION TO DECREASE INSTANTANEOUS ACID CONSUMPTION IN IN-SITU MINING

[75] Inventors: Peter James Lingane, Concord; Lawrence MacLagan Cathles, III, Cambridge; Limin Hsueh, Bedford, all of Mass.

[73] Assignee: Kennecott Copper Corporation, New York, N.Y.

[21] Appl. No.: 623,429

[22] Filed: Oct. 17, 1975

[51] Int. Cl.$^2$ .................................................. E21B 43/28
[52] U.S. Cl. ....................................... 299/4; 75/101 R; 423/36
[58] Field of Search ................... 299/1, 4, 5; 423/36; 166/271, 307; 75/101 R

[56] References Cited

U.S. PATENT DOCUMENTS

| | | | |
|---|---|---|---|
| 2,175,095 | 10/1939 | Stoesser | 166/307 |
| 2,563,623 | 8/1951 | Scott | 299/5 |
| 3,278,233 | 10/1966 | Hurd et al. | 299/4 |
| 3,616,852 | 11/1971 | Allen | 166/271 |
| 3,767,760 | 10/1973 | Hougen et al. | 75/101 R |
| 3,823,981 | 7/1974 | Lewis | 299/4 |
| 3,841,708 | 10/1974 | Girard et al. | 166/271 |
| 3,868,439 | 2/1975 | Wadsworth | 299/5 |
| 3,881,774 | 5/1975 | Van Poolen et al. | 299/4 |
| 3,910,636 | 10/1975 | Hard | 299/4 |

Primary Examiner—Ernest R. Purser

[57] ABSTRACT

This invention pertains to a method for in-situ mining of copper values from ore formations and, more particularly, this invention pertains to oxidative in-situ mining of copper wherein, for example, an oxygen-acid, a ferric iron-acid or a nitrate-acid lixiviant is being employed for recovering copper values. Further, this invention pertains to the recovery of copper from a deposit in which the ratio of pyrite to chalcopyrite is low. Still further, this invention pertains to a combination of acid-preinjection, monitoring, acid adjustment and additional monitoring or tell-tale ion monitoring for acid supply increase or decrease in the ore formation as steps in a combination for rendering highly controllable the acid preinjection process, thus providing further improvements to in-situ mining processes.

Additionally, this invention pertains to a broad range of in-situ leaching processes including, for example, oxidative leaching of nickel sulfides, molybdenum sulfides or rhenium sulfides, or an oxidative leaching of pitch blende.

17 Claims, 1 Drawing Figure

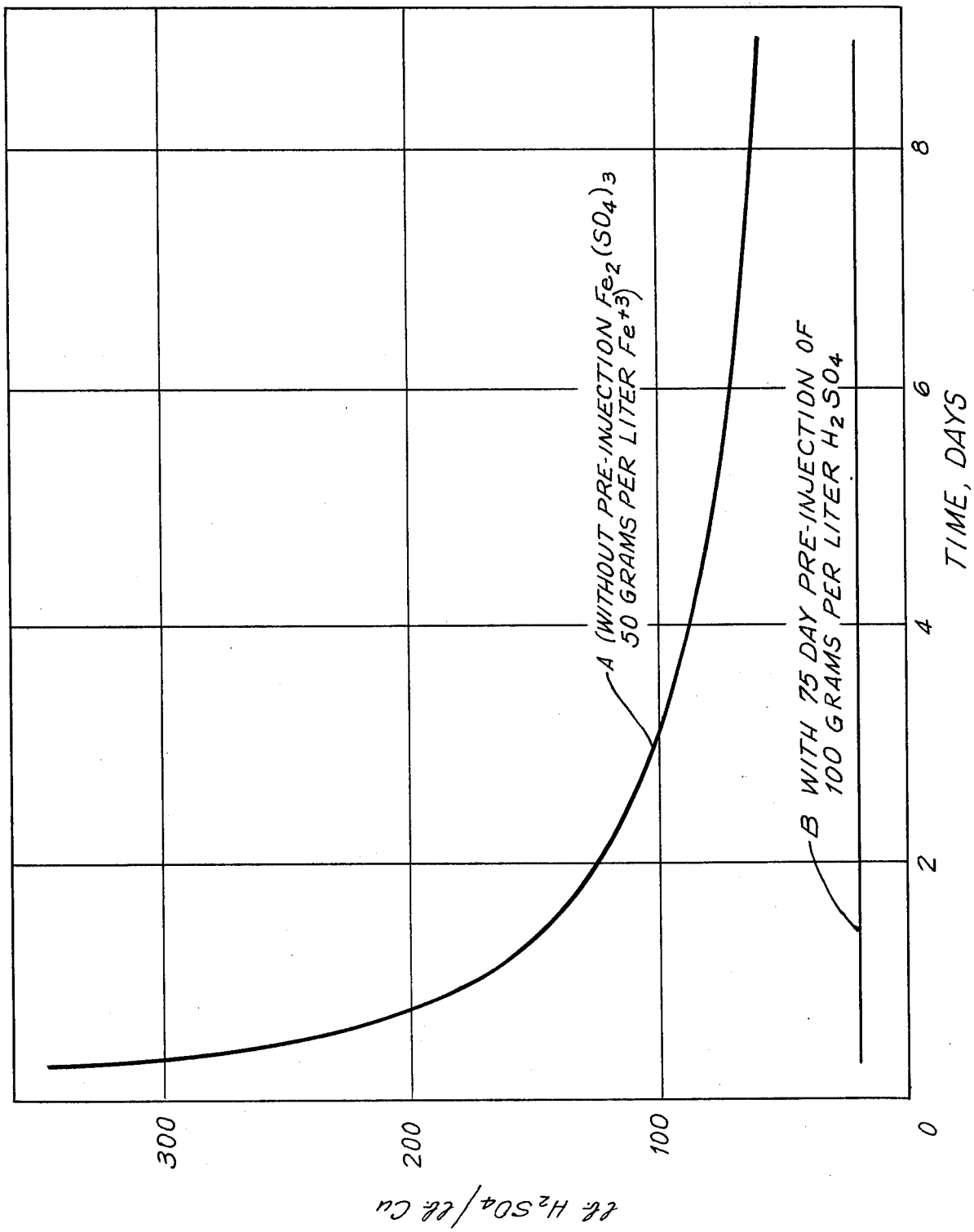

ACID PREINJECTION TO DECREASE INSTANTANEOUS ACID CONSUMPTION IN IN-SITU MINING

BRIEF DESCRIPTION OF THE BACKGROUND OF THE INVENTION

As the sources of metal ore bodies such as copper ore bodies which can be usefully mined in an open pit or underground mine become less and less exploitable, as leaner deposits must be worked in order to provide increasing needs of metals, the deeper deposits become prime candidates as sources of copper. These deeper deposits have not been mined because of economic considerations. However, these deposits have become outstanding candidates for in-situ recovery such as in-situ leaching. The deeper deposits thus are suggested for working by in-situ mining techniques without the environmental problems, associated with solid state waste disposal and air pollution which may be avoided but an unavoidable with conventional technology.

Although copper oxide ore bodies and sulfidic copper ore bodies have been mined by in-situ leaching of an oxide or a sulfide mineral from a body fractured by bulk caving or conventional explosives preparatory to in-situ leaching (e.g., U.S. Pat. Nos. 2,563,623 and 3,640,579 and 3,574,599), the utilization of deposits in which the ratio of pyrite to chalcopyrite is low present a number heretofore unappreciated considerations.

BRIEF DESCRIPTION OF THE INVENTION

It has now been found that in order to in-situ mine a deposit having a low pyrite to chalocopyrite ratio in the ore body, using an oxidant-acid lixiviant, the relative rates of acid and oxidant consumption must be properly interrelated.

Oxidation of chalocopyrite by oxygen or ferric iron does not generate significant acid in the ore body, e.g.,

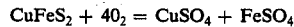

$$CuFeS_2 + 4O_2 = CuSO_4 + FeSO_4$$

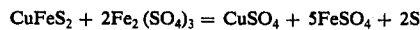

$$CuFeS_2 + 2Fe_2(SO_4)_3 = CuSO_4 + 5FeSO_4 + 2S$$

Oxidation by nitrate actually consumes acid

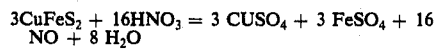

$$3CuFeS_2 + 16HNO_3 = 3\,CUSO_4 + 3\,FeSO_4 + 16\,NO + 8\,H_2O$$

Consequently, little or no acid generation is encountered in a pyrite free zone and such acid as might be produced is quickly neutralized by reaction with adjacent minerals such as biotite, calcite, horneblend, etc.

If the pH value of the acid lixiviant in the ore body rises above about 2-3 such salts (copper, iron, aluminum, etc.) as have been leached and put into solution will tend to precipitate into the flow channels of the ore body. In addition, at pH values above about 3, it is known that chalcopyrite oxidizes and leaches very much more slowly than at lower pH values.

Therefore, unless steps are taken to treat the ore body in a proper manner and in a proper sequence, so as to avoid the rise in pH value in the ore body, consequences encountered will be:

1. The leaching will be inhibited due to the rise in pH value. This will occur even when and where ample oxidant exists for leaching but pH values are high because of acid neutralization.

2. Where pH values rise above a certain level, iron, aluminum and copper salts will re-precipitate. Copper thus re-precipitated may be difficult to leach subsequently, and therefore, avoidance of such re-precipitation is important.

3. Precipitation of sulfate salts of iron, aluminum and copper and others will decrease the permeability of the deposit by filling the fractures and cracks through which solution flows. The decrease in formation permeability will lead to lower solution flow velocities since the injection pressure is limited by the cracking pressure of the rocks at the depth of the operation. Thus, precipitation and permeability impairment will promote further precipitation and permeability impairment. The deposit will tend to plug up and may be difficult to unplug.

4. The above mentioned sulfate salts would then tend to precipitate in open fractures that contained, in a typical deposit, the majority of the copper mineralization. Lixiviant contact with the copper bearing materials is also impaired. Thus, it is clear that reducing or minimizing precipitation is desirable.

The points made above indicate that unless steps are taken to prevent or inhibit a pH value rise, substantial oxidant may simply pass unused through deposit from injection to production hole. This should be avoided and oxidant utilization maximized.

In accordance with the problems outlined herein, a substantial rise in pH value in the deposit during oxidative leaching can be eliminated or minimize by acid preinjection. The purpose of the acid preinjectionn is to neutralize the most readily accessible acid consuming minerals in and immediately adjacent to the fractures in which fluid is flowing and so dramatically reduce the rate of acid neutralization. A sufficiently low pH value can then be maintained in the flow fractures in the ore body between injection and production holes and thus substantially reduce the rate of acid consumption when the oxidant is subsequently used. The acid preinjection step does not change the total acid consumed over the total duration of leaching. However, a greater utilization of the oxidant is realized and the initial catastrophic acid consumption associated with in-situ solution mining using an acid-oxidant lixiviant system is substantially eliminated.

For example, for each 100 grams per liter of $H_2SO_4$ preinjected into a formation, it has been found that approximately 6.1 grams per liter aluminum, 12.7 grams per liter ferric ($Fe^{+++}$) and 5.5 grams per liter magnesium salts will be generated until the acid is neutralized by biotite and other minerals. The aluminum and iron salts will be reprecipitated in the flow fractures when the pH exceeds a critical level (about pH 1.5 at a formation temperature of about 60° C.).

If 50 gram per liter of ferric iron oxidant has been injected along with the acid, (i.e., no acid preinjection step) from the start, then the iron from the oxidant would also be precipitated in the flow fractures along with the aluminum and ferric iron generated by the acid neutralization of biotite, more than tripling the salts precipitated.

If oxygen rather than ferric iron has been injected with the acid, it would leach copper ($Cu^{++}$) and iron ($Fe^{+++}$), from the chalcopyrite and these values would be precipitated as the pH rises, increasing, for an operational oxygen loading of 10 grams per liter, the precipitated salt by 60%; i.e., 6 grams per liter copper ($Cu^{+++}$) and 6 grams per liter iron ($Fe^{++}$) in addition to the 6.1 grams per liter aluminum and 12.7 grams per liter iron from the biotite.

If calcite is the main acid neutralizing mineral phase, the relative benefit of an acid preinjection step will be even greater, since the acid itself will generate less precipitatable salts as it is neutralized.

It has also been found that an ore body of sulfidic ores associated with acid consuming minerals, such as biotite, makes it necessary for economic in-situ working of the ore body, to treat the ore body in a proper manner and in a proper sequence. Thus, although it has been established in the past that, under steady state conditions, acid consumption (expressed as the rate of acid consumption relative to the rate of copper production) is directly proportional to biotite content in the ore body (ignoring the other silicates and calcite as a relative approximation) and that acid consumption is inversely proportional to the copper grade, the proper relationship of the ratio of acid consumption to acid capacity has not been understood too well as it relates to in-situ mining of the ore body such as for copper values from chalcocite/chalcopyrite ore deposits. Thus, it has been found that the ratio of acid consumption to acid capacity is fairly critical in the in-situ mining of copper values of low pyrite content ores.

If the ratio of acid consumption to acid capacity remains greater than one until the acid is consumed, the given economical degree of copper loading (such as on an assumed base level of 5 grams per liter) cannot be achieved before acid depletion sets in. Thus, for example, as a rough rule of thumb, the steady state acid consumption of a 1 gram per liter sulfuric acid lixiviant is 6 pounds of sulfuric acid per pound of copper recovered. On the preceding basis, the acid capacity of the lixiviant would have to be nearly 30 grams per liter if a 5 gram per liter copper loading of the lixiviant is to be achieved. In addition, acid concentration when leaching an ore body is fairly low and thus a large imbalance exists between the acid demand and acid supply, i.e., the difference between acid needed for the effective leaching and an available acid content for the direct recovery of the metal value, such as copper. Hence, an acid consumption of 6 grams per liter acid per gram of designed copper loading is a fairly severe limit and it also appears that this limit is fairly hard to achieve, if not impossible, in in-situ mining.

In order to place the severe requirements of an in-situ process in a proper perspective, the problems associated with acid capacity are that in an in-situ mining operation the relationships are worse than the above indications because acid consumption decreases as a square root of the declining acid concentration. The square root dependence is a direct consequence of diffusion control of the acid flux. However, the acid capacity, i.e., copper loading, decreases even more rapidly because it is in direct proportion to the declining acid concentration. As an example, the imbalance between acid consumption and acid capacity, is about 27 fold at a 1 gram per liter sulfuric acid concentration but increases to about 38 fold when the acid has been half neutralized and to about 85 fold when the acid is 90 percent neutralized.

Neither can the severe acid consumption be ignored by the evident expedient of employing sufficiently high acid concentration, because the acid consumption on the acid concentration required to bring the acid consumption and acid capacity into balance may well exceed 100 pounds of sulfuric acid per pound of copper recovered. On this basis, an in-situ process is clearly uneconomical.

Despite the above shortcomings, the in-situ process is moderated by the discovery herein which comprises the inventive embodiments or aspects. As one aspect, the in-situ leached ore body is being chemically pre-reacted or treated in such a manner as to prevent the unfavorable and permanent permeability degradation of the ore body by the precipitation of basic sulfate and aluminum salts near the wellbore. Basic iron precipitation may be represented as follows:

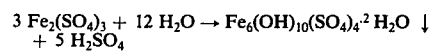

In addition, jarosite ($K_2Fe_6(OH)_{12}(SO_4)_4$) or jarositic materials are also formed.

This unfavorable and permanent permeability degradation is apparently initiated by the normal, catastrophic initial rate of acid neutralization. Thus, in addition to minimizing the precipitation of jarositic materials in the permeability zones, other precipitant formation is sought to be minimized as much as possible.

Still further, for an economic recovery, an approximate base level, i.e., a 33 percent efficiency for the utilization of an oxidant such as ferric-chloride for leaching of copper is a necessary bench mark.

While the long term rate of acid consumption is likely to be sufficiently low to avoid the precipitation of jarosite and other precipitants, the proper in-situ mining technique has been discovered providing for the front end acid consumption (even though greater than the acid capacity that can be supplied by the acid capacity of the leaching solution); it can now be satisfactorily controlled thereby offering a further advantage for in-situ mining.

In accordance with the discovery herein, the initial catastrophic rate of acid consumption can be minimized and the environment adjacent the wellbore can be brought to a condition such that the acid consumption is satisfactory if an iron free reaction condition is maintained in the environment with a sulfuric acid solution for a period which depends on hole spacing and which could be as long as 60 months. Generally, from 30 to 90 days is a sufficient period.

The acid treatment of the ore body is then followed such as by an acid-lixiviant injection and the operation thereafter is conducted by means of the normal, e.g., such as acid-lixiviant mining techniques.

Still further, since the acid pretreatment does not change the cumulative long term acid consumption and since the amount of acid involved at front end loading is small in comparison to the amount of acid which will be consumed over the life of the wellbore in an in-situ mining of a deposit, the acid pretreatment produces the differences which allows an economic attack on, e.g., the deep lying, low pyrite/chalcopyrite ratio deposits.

Thus, in accordance with the invention, the sole FIGURE illustrates the pounds of acid consumed per pound of copper recovered as a function of time on reaction without ferric iron being present and on a comparison basis when the ore body is treated with a common lixiviant having ferric iron present (the consumption being based on a time basis).

With reference to the figure, Curve A represents acid consumption when 100 gpl sulfuric acid in admixture with 50 gpl ferric ions is reacting with an ore formation assuming the efficiency of oxidant utilization is 33%, the copper grade is 0.5% the rock contains 10% biotite, and the matrix porosity is 1%. However, for the same system, if an acid preinjection of 100 gpl sulfuric acid is carried out for 75 days, the acid consumption upon initiation of leaching with 100 gpl acid in admixture with 50 gpl ferric ions is approximately represented by Curve B.

For the above Curves A and B, it is evident that a solution containing 100 gpl (grams per liter) and 50 gpl $Fe^{+++}$ cannot long support an acid consumption in excess of 2 lb.$H_2SO_4$/1 lb.$Fe^{+++}$ (reduced) without the precipitation of jarositic materials. Accordingly, if a 33 percent efficiency for the utilization of $Fe^{+++}$ for the leaching of Cu is a bench mark, then the acid consumption must be less than about 20 lb.$H_2SO_4$/1 lb.Cu, if the precipitation of jarositic material is to be avoided. As is evident from Curve A, the long term rate of acid consumption is likely to be sufficiently low as to avoid precipitation of the jarositic materials; however, the short term rate of acid consumption, will exceed the acid capacity of the solution thus causing the precipitation of jarosite.

The initial catastrophic rate of acid consumption can be eliminated and the in-situ environment adjacent the wellbore can be brought immediately to the region of satisfactory acid consumption by pre-reaction of this region with an iron-free, 100 gpl $H_2SO_4$ solution for a period such as 90 days (e.g., 75 days are shown in FIG. 1 for Curve B), generally from 10 to 75 days, more often from 20 to 75 days are sufficient. This preinjection is then to be followed by the acidic-ferric sulfate lixiviant as shown and the operation proceeds thereafter with that lixiviant. Inasmuch as the acid consumption in an ore body under consideration, whether leached by an oxygen system, in a low pyrite zone, acidic nitrate lixiviant, or with a ferric sulfate lixiviant in a chalcopyrite zone, the initially rapid rate of acid consumption is observable under both conditions. Since the acid consumption in-situ is common to these systems and critical to these lixiviants, the acid reaction, free of precipitation of the lixiviant solubilized ore compounds, is a necessary consideration for the economic working of the metal deposit, such as copper deposits.

Still further, as it has been mentioned before, in an oxygen-sulfuric acid lixiviant, which has the potential of generating significant amounts of acid through the oxidation of sulfides and the subsequent oxidation, hydrolysis and precipitation of iron must be controlled in such a manner that no catastrophic consequences of the chemical reaction impair the further processing of these ore bodies. Thus, in the absence of pyrite, that is, where chalcopyrite would be the major available sulfide in many deposits, the amount of acid generated is critically dependent on the degree to which chalcopyritic sulfur is oxidized to sulfate and whether or not the iron phase is an iron hydroxide or a basic iron sulfide.

In the rock matrix, in the absence of hydrated iron oxides these oxides are produced from the sulfate solution in the oxidation of chalcopyrite; however, in the presence of the rock matrix, the jarositic materials provide the major iron phases. Still further, inasmuch as in the presence of rock, iron product phases are also produced by acid attack on the ferromagnesium oxides of pyrite, the observation of jarosite as the major iron product does not necessarily mean that jarosite precipitants are produced in the oxidation of chalcopyrite. Hence, if jarosite is being produced in the oxidation in which chalcopyrite is found with it, in the presence of rock, acid may be neither generated nor consumed. However, in an oxygen system, it is a fairly valid assumption that about 75 percent of the chalcopyritic sulfur is oxidized to sulfate, but without any net generation of acid.

Additionally, it is fairly evident that acid is consumed in transit from the interior of the rock as a leaching condition by reaction with biotite and other reactive silicates. As a consequence, the prior assumptions concerning the acid generation in the oxidation of sulfides in a low pyrite zone has been discovered to be insignificiant. Therefore, an oxygen-sulfuric acid lixiviant behavior, with respect to the pH of this solution in rock fractures, has been found to be different for this reason. Accordingly, it has been found that a two-phase oxygen-lixiviant solution closely approximates leaching under a constant oxygen partial pressure. That is, the gas volume shrinks as the oxygen is consumed so that the oxygen partial pressure and thus the concentration of dissolved oxygen is approximately constant until such time as the bubbles disappear. However, there must be enough oxygen present to yield a solution for a selected lixiviant capacity base level of e.g. 5–4, or 3 grams per liter of copper.

In accordance with the above invention, an illustrative in-situ system of an oxygen/sulfuric acid lixiviant in a low pyrite deposit of copper ores at a depth of 3,550 ft. is of the following characteristics:

| | |
|---|---|
| 1 - copper grade | 0.4% |
| 2 - biotite grade | 16.0% |
| 3 - copper loading (benchmark level) | 5 gpl |
| 4 - oxygen solubility, $C_{O_2}$ | $8 \times 10^{-5}$ mol/cm$^3$ (at 1500 psi) |
| 5 - matrix porosity ($\phi$) | 1% = 0.01 |
| 6 - chemical rate contant for acid consumption, $\alpha H$ | 1 sec$^{-1}$ |
| 7 - chemical rate constant for oxygen consumption, $\alpha O_2$ | $10^{-4}$ sec$^{-1}$ |
| 8 - effective diffusion coefficient | $2 \times 10^{-6}$ cm$^2$/sec |
| 9 - oxygen consumption | 3.5 mol $O_2$/mol Cu |
| 10 - Volume of bleached rim produced per mol of reactant consumed ($\gamma$) $\gamma O_2 = 1800$ cm$^3$/mol $O_2$ $\gamma H = 250$ cm$^3$/mol $H_2SO_4$ | |
| 11 - $\phi \gamma_{O_2} C_{O_2} = 1.4 \times 10^{-3}$ | (dimensionless) |

Bleached rim is defined as the zone in which the reactive minerals have been depleted.

Based on the above values for the described system the following table illustrates the relative behavoir of the oxygen acid system based on the data obtained.

TABLE I

| gpl $H_2SO_4$ in oxygenated solution | Initial Acid Consumption, #$H_2SO_4$/#Cu | | | Steady State Consumption, #$H_2SO_4$/#Cu | Acid Capacity #$H_2SO_4$/#Cu |
|---|---|---|---|---|---|
| | No Pre-reaction | 30 Days Pre-reaction 33 gpl $H_2SO_4$ | 100 gpl $H_2SO_4$ | | |
| 500 | 1510 | — | — | 120 | 100 |
| 400 | 1350 | — | — | 107 | 80 |
| 300 | 1160 | — | — | 93 | 60 |
| 200 | 950 | — | — | 76 | 40 |
| 100 | 660 | — | 62 | 53 | 20 |

TABLE I-continued

| gpl $H_2SO_4$ in oxygenated solution | Initial Acid Consumption, $\#H_2SO_4/\#Cu$ | | | Steady State Consumption, $\#H_2SO_4/\#Cu$ | Acid Capacity $\#H_2SO_4/\#Cu$ |
|---|---|---|---|---|---|
| | No Pre-reaction | 30 Days Pre-reaction | | | |
| | | 33 gpl $H_2SO_4$ | 100 gpl $H_2SO_4$ | | |
| 50 | 245 | 54 | 31 | 38 | 10 |
| 25 | 173 | 27 | 16 | 27 | 5 |
| 10 | 109 | 11 | 6 | 17 | 2 |
| 5 | 76 | 5 | 3 | 12 | 1 |
| 1 | 31 | 1.1 | — | 5.4 | 0.2 |
| 0.5 | 20 | 0.3 | — | 3.8 | 0.1 |
| 0.1 | 6 | — | — | 1.7 | 0.02 |

Inasmuch as the acid concentration is a variable over which some control can be exerted, the above data illustrate a significant relationship, i.e., the acid capacity of the solution, as defined, relative to the final cooper loading is equivalent to an initial acid concentration divided by the base level solution containing copper that, is, 5 gpl of copper. Thus, in a 1 gpl $H_2SO_4$ solution, the acid capacity is as follows:

$$1 \text{ gpl } H_2SO_2SO_4/5 \text{ gpl Cu} = 0.2 \text{ lb. } H_2SO_4/1 \text{ lb. Cu}$$

Inasmuch as no significant acid generation in-situ has been assumed for the above indicated reason, the acid concentration at any point will change with time along a flow fracture. Furthermore, as the leaching of disseminated chalcopyrite is not being undertaken initially, the inaccuracy of the early stage of leaching operation, that is, before the sulfides have been leached from the flow fractures, takes on the significance that the prereaction of the rocks is indeed an advance in in-situ recovery of mineral values.

It must also be distinguished that under the steady state conditions, the fluxes of both acid and oxygen into the rock are solely limited by the relative rates of diffusion. As a consequence, under steady state conditions using the above system, the acid consumption (expressed as the rate of acid consumption relative to the rate of copper production) is directly proportional to copper grade. Hence, the ratio of acid consumption to acid capacity becomes important.

Therefore, in an oxygen-sulfuric acid system, the same as for the ferric iron-sulfur acid system, the initial acid consumption is likely to be considerably larger than the steady state consumption; and the necessary pre-reaction requires the employment of acid reaction of the rocks without oxygen being present (this would be about on the order of 30 grams per liter of sulfuric acid for a period of 30 days). A pre-reaction for this reason requires establishing the steady state acid consumption immediately upon injection of the oxygen-dilute acid lixiviant. Again, the acid prereaction for this magnitude does not affect the cumulative acid consumption for the life of the ore body, but it does front-end load some of the total acid costs at a considerable advantage in respect to control of undesired precipitation and thus control of leaching, economy in mining, and resonable rate of in-situ leaching.

The following is a description for the method of controlling input acid concentration.

Once sufficient acid has been preinjected to eliminate the difficulties overcome by this invention, it is advantageous to reduce the acid concentration to the lowest value consistent with continued leaching of the chalcopyrite or other value minerals. To do otherwise would result in unnecessary acid consumption and an unnecesarily large surface plant devoted to solution preparation. What is needed and what has now been discovered as another aspect of the invention is a method to signal the point at which preinjection should cease and a method whereby the acid subsequently applied to the system can be maintained at a proper minimum value.

The method for determining the end of the preinjection period is based on two fundamental facts. First, it is widely known and it has been confirmed that carbon dioxide and solubilized iron, aluminum, copper and magnesium salts are the major products on reaction of acid oxidants with mineralized porphyric rock. Second, basic metal salts are precipitated in a definite sequence as these weakly acidic solution are further neutralized on contacting additional rock. For example, a solution initially containing 5 gpl $Fe^{+3}$, 3 gpl Al, 6 gpl Cu and 3 gpl Mg (as sulfates) precipitates first jarositic iron salts, then basic aluminum sulfates and next antlerite $Cu_3(OH)_4SO_4$ and/or malachite $Cu_2(OH)_2CO_3$ and/or brochantite $Cu_4(OH)_6SO_4$. Magnesium is not precipitated. From information such as this, it is evident that there is a definite threshold aluminum concentration associated with each copper concentration. In this specific example, it is known that the solution must contain at least 2 grams per liter residual Al if it is to contain 6 gpl copper and at least 1 gpl Al if it is to contain 4 gpl copper. Hence, Al concentration may range from trace amounts up to e. g. the desired copper loading level for the lixiviant. Once aluminum is produced at the threshold level, the preinjection period is ended and the acid concentration can be reduced. Thus, aluminum in this example is selected as an appropriate monitor ion to the beginning of the end of preinjection and to establish the reduced acid injection period.

The monitor ion and its threshold concentration (i.e., threshold control point) are determined empirically for each ore by the following procedure: Crush a representative composite to approximately minus 100 mesh or any other size to permit complete fluid access to most mineral grains. Prepare a solution containing copper at the maximum expected concentration and acid at the strength to be preinjected. Treat the crushed material at the temperature and pressure conditions in-situ, with a portion of the acid copper solution. Monitor the metal ion concentrations with time. (A low solution to solid ratio will minimize the time required. No more than 1–5% of the acid consuming minerals should be neutralized.) Select the monitor ion and its threshold concentration from the solution composition at the point where copper begins to precipitate.

The method of controlling the inlet acid concentration, after the preinjection period, is also specific to each acid oxidant system and has also been discovered as part of the overall acid "preinjection" process, (not truly acid "preinjection" any longer) but a necessary adjunct to the overall process of which acid preinjection is an important element in the combination.

For example, the acid concentration has been reduced too far if unreacted nitrate ion is produced on injection of an acidic nitrate lixiviant. As another example, the acid concentration has been reduced too far unless a substantial fraction of the injected iron is produced on injection of an acid ferric lixiviant.

For the acidic oxygen lixiviant, one would use a modification fo the threshold procedure described above. Should the monitor ion, for example Al, fall below its threshold value one would increase the injection acid concentration; conversely, should its concentration rise, one would reduce the acid concentration.

Of course, one would need to redetermine the threshold control point periodically (e. g., weekly or monthly) as salts build up in the recycled solution and the buffering characteristics of the solution are thereby altered; these redeterminations are according to the procedure given above.

Again, with respect to the above, the acid consumption to acid capacity discussion above must be remembered. Hence, the followed disclosure of a buffered solution represents another aspect of the invention in respect to the avoiding of the consequences of the increased acid consumption without loss of acid capacity.

In this aspect to the invention, a buffered solution of an acid such as ammonium disulfate-sulfuric acid solution or magnesium di-sulfate-sulfuric acid buffer solution is used as it is also suitable for the front-end reaction. In respect to this aspect of the invention, the advantage residue in the losses which can be tolerated when magnesium sulfate is consumed because as a result of the solution of magnesium silicates in-situ, these supply further amounts of magnesium sulfate not unduly affecting the economic considerations. However, it is noted that a 50% loss of a 2-mole ammonium disulfate solution represents a 9 lb. consumption of ammonium disulfate per pound of copper or on an economic scale, it is approximately 12 cents loss per pound recovered at $ 25.00 ton of $NH_4HSO_4$.

Still further, an additional consideration has been a hydrochloric acid system as an acid system used with ferric chloride treatment; and it has also been discovered despite the greater problems of corrosion, gas formation in the wellbore, etc. that the pre-reaction of the rocks with hydrochloric acid renders the acid requirement considerably more advantageous based on the hydrochloric acid consumption.

In accordance with the above invention, the following embodiment is illustrative for the determination of the appropriate pre-reaction and the advantages which accrue therefrom for a ferric iron-sulfuric acid system. The embodiment is merely illustrative but is not intended to limit the broader, generic scope of the invention. Accordingly, an injection of 300 grams per liter of sulfuric acid for a minimum of 40 days is being carried out with the fluid retrieval from an adjacent wellbore sampled after 2, 10 and 40 days. As the rate of acid consumption is generally decaying as $1/t^{\frac{1}{2}}$, the acid consumption rates can be easily monitored. As a minimum of 10 gpl of unreacted sulfuric acid at the monitoring station in the wellbore indicates steady state acid consumption conditions have been achieved (or using the monitor ion and threshold control point approach above), then the injection of 50 gpl of ferric sulfate solution + 50 gpl of sulfuric acis can begin. At this ferric concentration a utilization efficiency of 33 percent of ferric ion is assumed. If higher utilization rate is evident, the concentration should be appropriately reduced. If the total pre-injection time is appropriate and the reaction at the selected time is appropriate, the unfavorable permeability change due to precipitation of ferric salts should not occur. It is also noted that the shift to an oxygen and sulfuric acid lixiviant solution can be carried out appropriately.

The injection of the appropriate lixiviant is continued until effluent copper, iron, aluminum and magnesium concentrations stabilize; generally, the stabilization period is established within 60 days.

The above concentrations and injections have been carried out with a copper loading at about 5 gpl (undiluted basis) and the overall acid consumption is about 60 pounds of acid per pound of copper. The effluent stream is generally also comprised of 30 grams per liter of each of aluminum and magnesium and about 100 grams per liter of ferrous iron (undiluted basis).

With respect to the above, the following requirements illustrate the above:

300 gpl $H_2SO_4$ at 10 gpm (ge/minute) for 40 days = 18 tons/day $H_2SO_4$ 50 gpl $H_2SO_4$ at 10 gpm for 60 days = 3 tons/day $H_2SO_4$ 50 gpl $Fe^{+++}$ at 10 gpm = 15 tons/day $Fe_2(SO_4)_3 \cdot nH_2O$ cumulative acid (40 + 60 days) = 900 tons cumulative iron (60 days) = 900 tons cumulative water = 1.5 MMG An additional embodiment directed to hydrochloric acid pre-reaction as illustrated with 6 molar HCl/1 molar $FeCl_3$ may be appropriately calculated.

With respect to the hydrochloric acid-ferric chloride system, as a general approximation, there is less likelihood of precipitation problems with this system; and, therefore, this system permits shorter pre-reaction periods. However, there are greater problems with corrosion, gas producing reactions due to the presence of calcite, and costs of raw materials. Nevertheless, fewer problems are evident because ferric chloride is more readily dissolved as is the redissolving of jarosite precipitated in situ.

Leaching may also be accomplished by the previously mentioned nitrate lixiviant system which is a hydrometallurgical process which uses an acidic leaching solution containing nitrate ions and having a pH of from about 0.2 to about 2.0. Preferably the pH range will be between about 0.5 to 1.5. After drilling at least one hole and sealing at least a portion thereof, the leaching solution is introduced into the wellbore and then into the zone in the formation immediately surrounding said wellbore. In this manner, it has been found that such leaching solution can extract substantial quantities of metal values into the solution.

The acidic nitrate ion leaching solution has been found to provide a very inexpensive oxidizing agent and lixiviant and this solution functions extremely well in the recovery of mineral deposits, particularly those in the sulfide state.

The acidic (aqueous) leaching solution has two features. The first feature is the utilization of the nitrate ion. The nitrate ion can be furnished by any means including, without limitation, both organic and inorganic compounds. Examples of such compounds include, without limitation, alkali metal (sodium, potassium, lithium, and cesium) nitrates, ammonium nitrate, ferric nitrate, and nitric acid. The nitrate material, e. g. $NaNO_3$, is present in the leaching solution in any amount in order to obtain the desired end result. It is preferred, however, that such nitrate material be present in an amount of from about 1 percent to about 10.0 percent by weight based on the total weight of the leaching solution.

The second feature of the leaching solution is the acidity thereof. The ratio of hydrogen ion($H^+$) to nitrate ion ($NO^-_3$) in the leach solution must be at least 4. Any ratio greater than 4 provides excess acid capacity. It has been found that it is important to maintain the pH thereof at a value below 2 and preferably of from about 0.2 to about 1.5 after the preinjection stage. Higher and lower pH values will not substantially achieve the desired end result. At higher pH values the reaction rate is slowed to the point of being completely impracticable. At lower pH values, the acid needed to react with the nitrate ion and the sulfides in the ore body is preferentially consumed by the host rock, consequently making the nitrate ion less effective as an oxidizing agent. Thus, the process is to be operated in a range of pH values where the acid consumption by the host rock can be and is minimized.

The leach solution is made up to supply sufficient acid capacity such that nitric oxide (NO) is produced in the ore. Thus for each nitrate ion ($NO_3^-$) present there must be at least four hydrogen ions ($H^+$). The acidity of the leaching solution is desirably provided by $H_2SO_4$.

The advantage of using $H_2SO_4$ as an acid source is that the bisulfate ion ($HSO_4^-$) is used to buffer the system so that the hydrogen ion ($H^+$) can be supplied to the reaction at a pH value above about 0.5. Thus, the expected preponderant reaction may typically be represented as

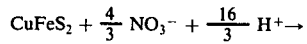

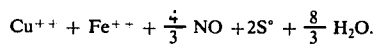

The temperature of the acidic leaching solution which is supplied to the underground leaching zone is preferably above about 30° C. The temperature of the underground leaching zone preferably is above about 30° C. If necessary, heat may be supplied to the underground ore body. However, the temperature of the acid leach solution, which is supplied to the wellbore, is any temperature which will produce the desired end result. Thus, the acid leach solution may be supplied at ambient temperature up to 90° C or more preferably above about 30° C to about 75° C.

The nitrate leaching method outlined is particularly applicable to the economic recovery of copper from deep deposits of primary copper sulfides, such as chalcopyrite ($CuFeS_2$). For economic recovery of copper values from most deeply buried copper sulfide deposits, a leaching solution containing at least about 0.5 molar nitrate ion, 0.3 molar $H_2SO_4$ and 0.3 molar $Na_2SO_4$ and having a pH value of about 0.5 will be satisfactory. Sodium sulfate $Na_2SO_4$ concentration in the leach solution may range from about 0.3 molar up to about 12.0 molar. Sodium sulfate is the preferred salt to adjust and control the pH value. However, any soluble inorganic sulfate salt may be used; non-limiting specific examples include ferrous sulfate, ammonium sulfate, zinc sulfate, and magnesium sulfate.

The above method has been further described in U.S. Application Ser. No. 422,232 filed Dec. 6, 1973, now U.S. Pat. No. 3,910,636, which is incorporated herein by reference.

The other disclosed systems are well known in the art and need not be further described.

It is to be understood that this invention can be practiced by using only one hole for introducing the liquid leaching solution and then recovering the pregnant solution therefrom. Also, two or more holes penetrating the ore body may be used so that the leaching solution can be introduced into the ore body through at least one hole and the pregnant solution recovered from at least one different hole.

The appended claims define the invention described in the specification herein and are to be considered in connection with the full range of the equivalents pertaining to each element in the disclosed combinations.

What is claimed is:

1. In in-situ solution mining for metal values in a deep lying deposit, the process comprising sinking at least one hole in said deposit, injecting an oxidant containing acid lixiviant for said metal values into at least one hole in said deposit, and recovering a pregnant lixiviant containing metal values from at least one of said holes, the improvement comprising, prior to the injection of said lixiviant, injecting an acid solution into said deposit for pre-reaction with acid neutralizing minerals in said deposit and maintaining said acid solution in contact with said deposit for a sufficient period of time to stabilize a leached metal response into said deposit to said lixiviant.

2. The process as defined in claim 1 wherein said acid and said lixiviant introduced into the same hole, and said pregnant lixiviant is removed from an adjacent hole.

3. The process as defined in claim 1 and wherein the acid injected for pre-reaction is substantially oxidant-free sulfuric acid.

4. The process as defined in claim 1 wherein the acid injected for prereaction is substantially oxidant-free hydrochloric acid.

5. The process as defined in claim 1 wherein the acid injected for pre-reaction is substantially oxidant-free sulfuric acid and the lixiviant is an acidic nitrate ion solution.

6. The process as defined in claim 1 wherein the acid is introduced in said hole for up to 60 months before said lixiviant is introduced.

7. The process as defined in claim 1 wherein the deposit contains copper values.

8. The process as defined in claim 7 and wherein the copper values are contained in an ore body having a low pyrite to chalcopyrite ratio.

9. The process as defined in claim 1 and wherein the deposit contains a sulfidic metal value selected from the group consisting of copper, nickel, molybdenum, rhenium and mixtures thereof.

10. The process as defined in claim 1 wherein the deposit is pitch blend.

11. The process as defined in claim 1 wherein the preinjection reaction for the said stabilized response and acid consumption is monitored by selecting an appropriate monitor ion.

12. The process as defined in claim 11 wherein the preinjection reaction for said stabilized response and acid consumption is monitored by selecting aluminum ion as the monitor ion.

13. The process as defined in claim 11 wherein the preinjection reaction for said stabilized response and acid consumption is monitored by selecting aluminum as the monitor ion and an appropriate threshold concentration for said monitor ion.

14. The process as defined in claim 1 wherein the period of time to stabilize a leached metal response in said deposit is established by (a) preinjection acid consumption, (b) the selection of appropriate monitor ion, and (c) the selection of appropriate threshold concentration for said monitor ion.

15. The process as defined in claim 14 wherein the threshold control concentration of said monitor ion is periodically redetermined for a recycled lixiviant solution.

16. The process as defined in claim 1 wherein after the preinjection period the injected acid concentration is adjusted based on reacted lixiviant ion production or injected lixiviant ion recovery.

17. The process as defined in claim 1 wherein after the preinjection period the injected acid concentration in an acidic-oxygen lixiviant system is monitored by selecting an appropriate monitor ion, its threshold concentration value and maintaining said monitor ion concentration by increasing said injected acid concentration when said monitor ion concentration falls below said threshold value and decreasing said acid concentration when said monitor ion concentration rises above said monitor ion concentration threshold value.

* * * * *